(No Model.) 4 Sheets—Sheet 1.
P. HANSON.
HARVESTER FRAME.
No. 256,477. Patented Apr. 18, 1882.
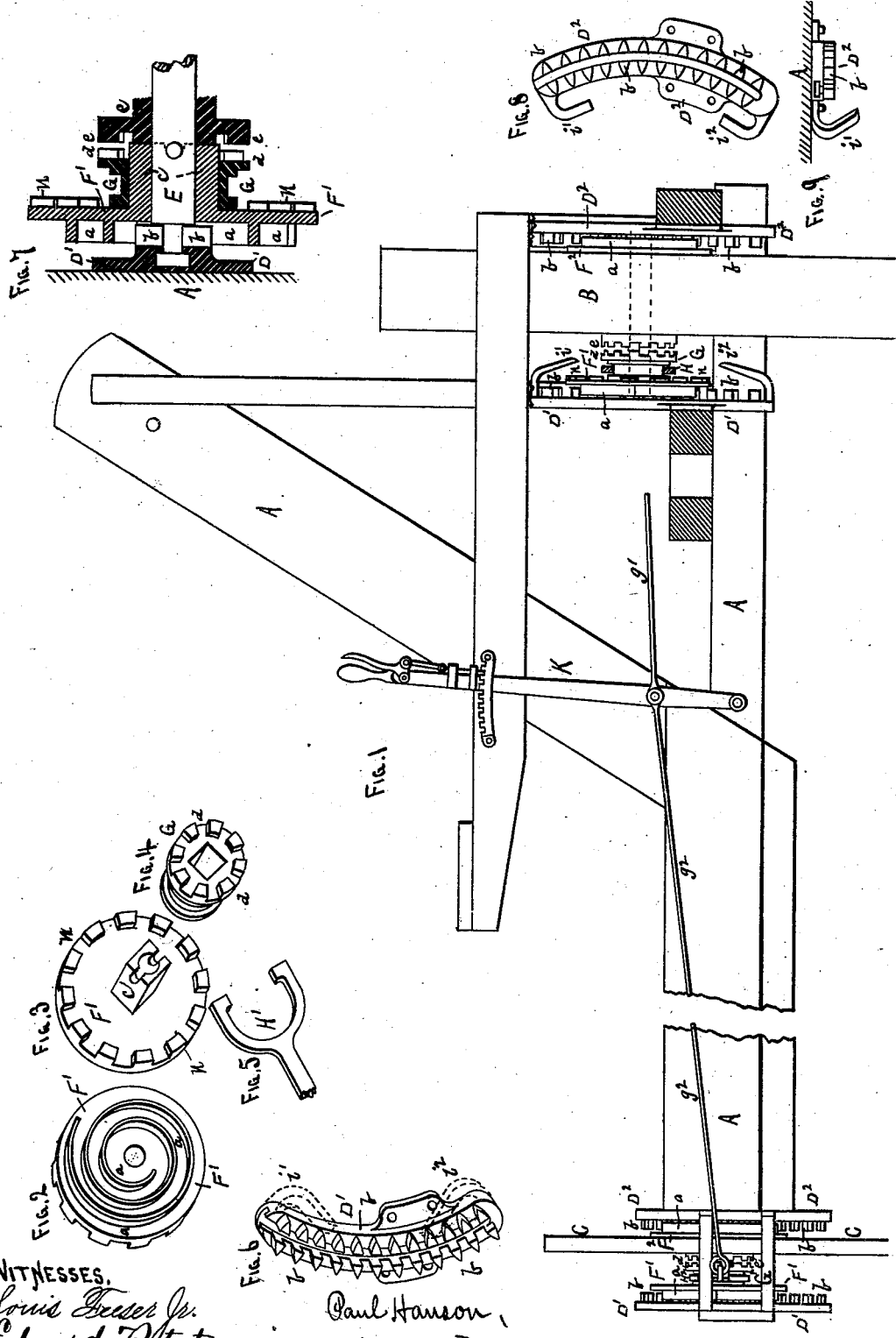

(No Model.)  
4 Sheets—Sheet 2.

P. HANSON.
HARVESTER FRAME.

No. 256,477. Patented Apr. 18, 1882.

Witnesses  
Louis Feeser Jr.  
Edward Rotert.

Paul Hanson.  
Inventor, By  
Louis Feeser & Leo, Att'ys.

(No Model.) 4 Sheets—Sheet 3.

P. HANSON.
HARVESTER FRAME.

No. 256,477. Patented Apr. 18, 1882.

Witnesses
Louis Feeser Jr.
Edward Rotcht

Inventor,
Paul Hanson,
By Louis Feeser & Co.
Atty's.

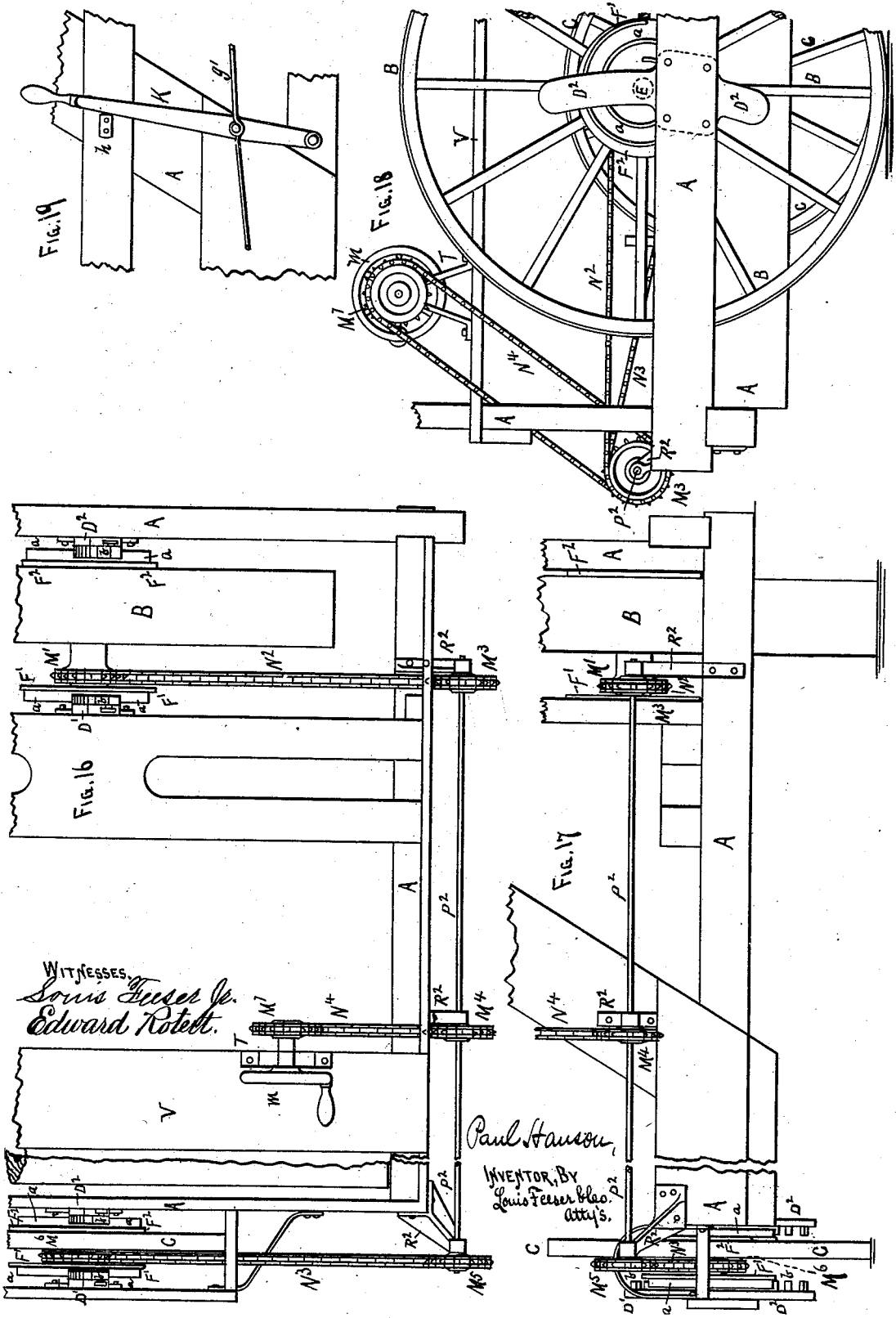

UNITED STATES PATENT OFFICE.

PAUL HANSON, OF SALEM, MINNESOTA.

HARVESTER-FRAME.

SPECIFICATION forming part of Letters Patent No. 256,477, dated April 18, 1882.

Application filed September 27, 1881. (No model.)

*To all whom it may concern:*

Be it known that I, PAUL HANSON, a citizen of the United States, residing at Salem, in the county of Olmsted and State of Minnesota, have made certain new and useful Improvements in Devices for Raising and Lowering Harvesters, &c., of which the following is a specification.

This invention relates to devices for raising and lowering the frames of harvesters, &c., to adjust the height of the cut of the sickle-bar and for other purposes; and it consists in providing the side irons in which the axle runs with teeth projecting from their inner faces and adapted to be acted upon by a scroll-rib upon a face plate or disk revolving with or upon said axle, so that when said disk and scroll-rib are revolved the side irons will be raised or lowered, carrying the frame with them, and thus adjust the sickle-bar higher or lower, as hereinafter set forth.

The invention further consists in the manner of constructing the mechanism whereby the disks and scroll-ribs are operated, as hereinafter shown.

I attain these objects by the use of the mechanism illustrated by the accompanying drawings, in which—

Figure 10:
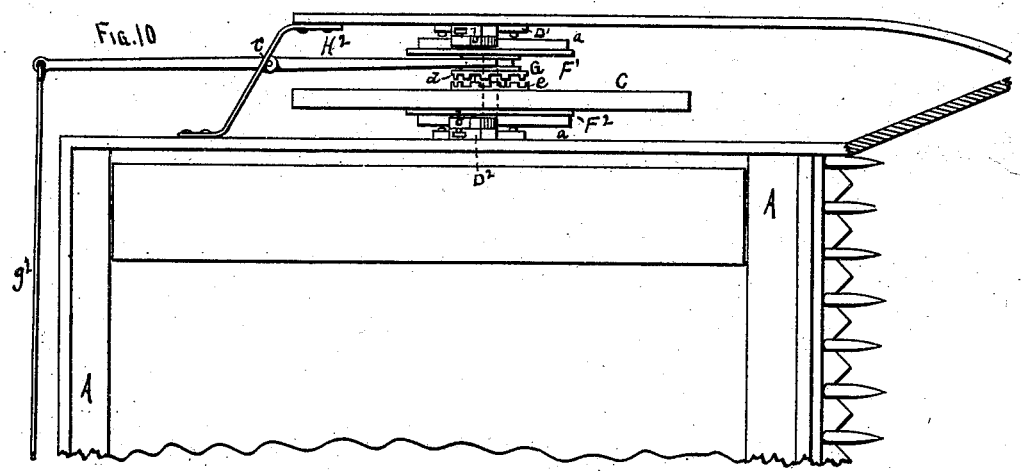
Figure 11:
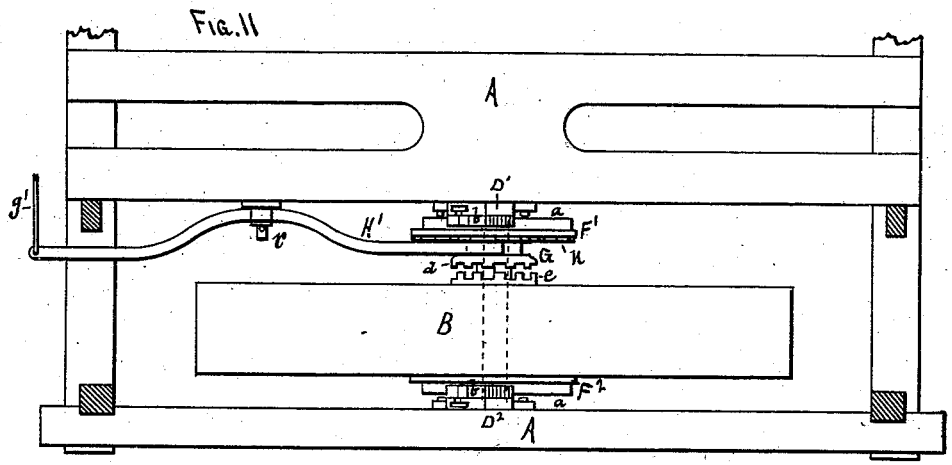
Figure 12:
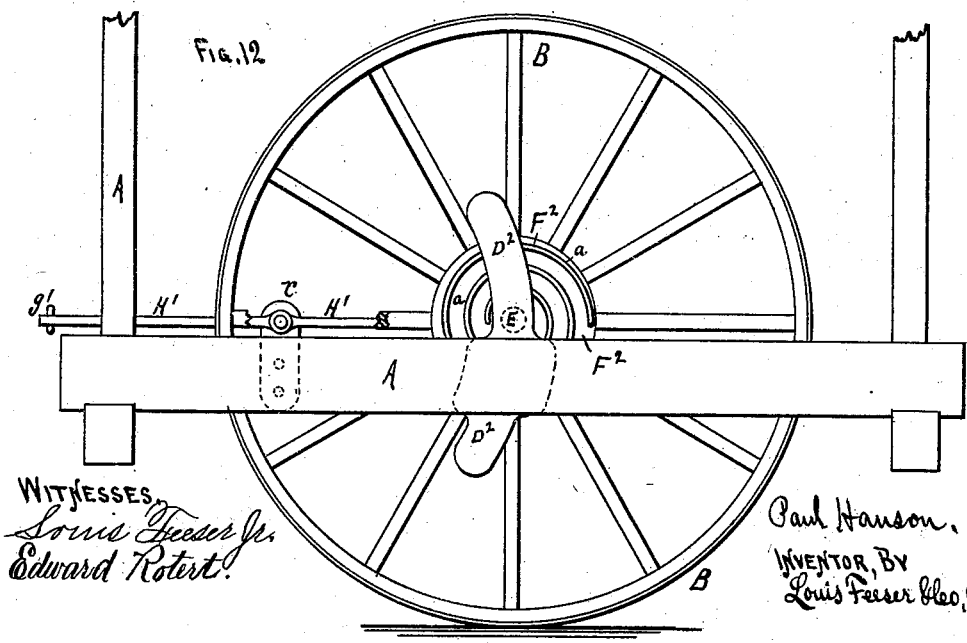
Figure 13:
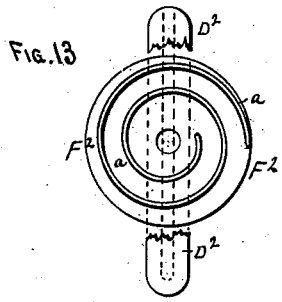
Figure 14:
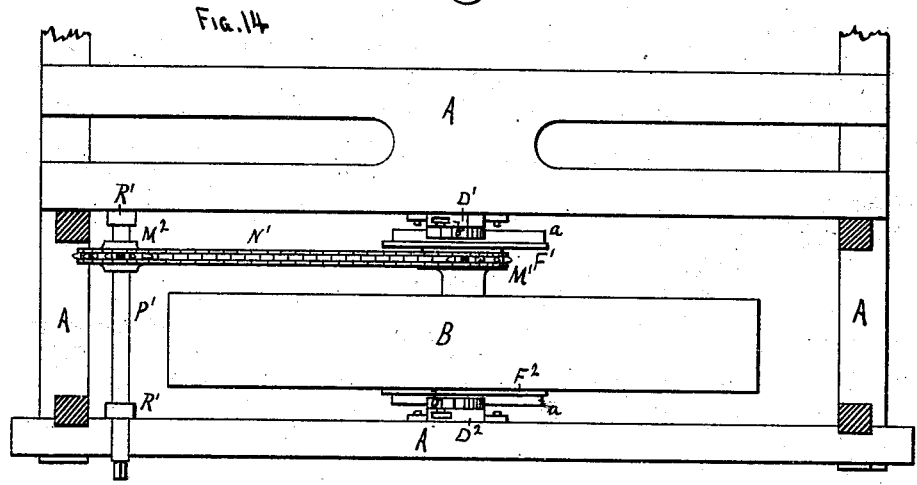
Figure 15:
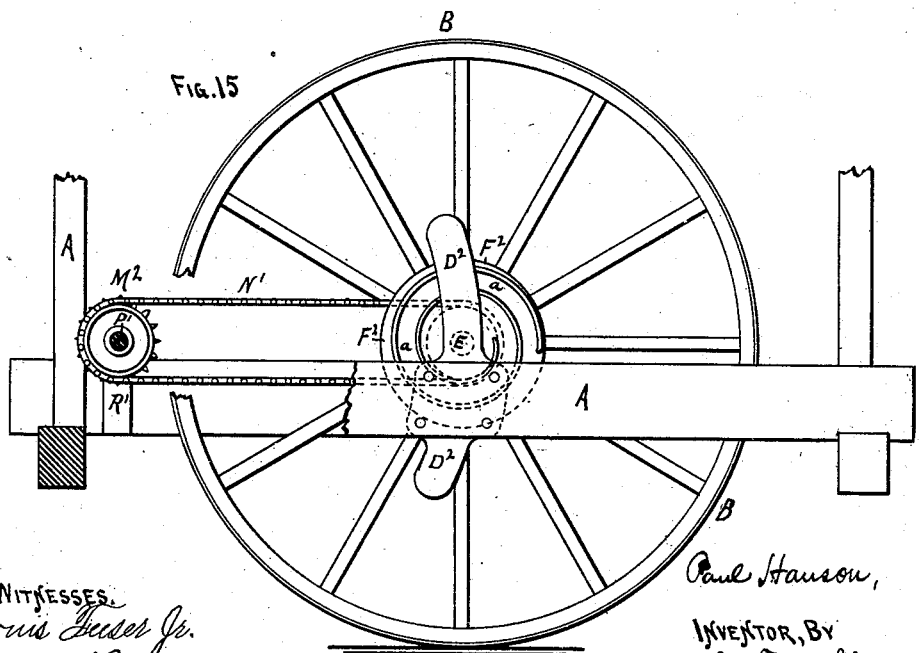

Figure 1 is a sectional rear elevation of a harvester with my improvements attached thereto. Fig. 2 is a persective front view, and Fig. 3 is a perspective rear view, of the scroll-ribbed disk detached. Fig. 4 is a detached perspective view of the sliding friction-collar, and Fig. 5 is a similar view of a portion of the operating-lever. Fig. 6 is a detached perspective view of one of the toothed side irons. Fig. 7 is an enlarged sectional plan view of one of the side irons, scroll-ribbed disks, and clutches detached. Fig. 8 is a front view, and Fig. 9 is a plan view, of one of the side irons detached. Fig. 10 is a plan view of the grain-wheel end of the harvester, showing the manner of applying the device to that end, and Fig. 11 is a similar view of the drive-wheel end of the machine, while Fig. 12 is an end view of Fig. 11, Figs. 10, 11, and 12 being plan and end views of Fig. 1, and showing the manner of arranging the raising and lowering device, so that the power of the drive-wheel and grain-wheel may be utilized to operate it. Fig. 13 is a sectional side view of one of the side irons and scroll-ribbed disks detached, showing the side iron straight instead of curved. Fig. 14 is a plan view, and Fig. 15 is an end view, of the drive-wheel end of the harvester, showing one method of operating the raising and lowering mechanism by hand; and Figs. 16, 17, and 18, a plan view and rear and end elevations, showing the manner of arranging the mechanism when the drive-wheel and grain-wheel ends are both to be operated at the same time by the driver from his seat. Fig. 19 is a view of a portion of the rear of the frame, showing a variation in the manner of arranging the operating-lever.

A is the frame, B the drive-wheel, and C the grain-wheel, all made and arranged in the usual manner.

$D'$ $D^2$ are the side irons attached to the frame A, and throughout whose length dovetail grooves are formed and adapted to receive the shouldered ends of the axle E, so that it is free to be raised and lowered or revolved, but is prevented from moving endwise.

Attached to the axle E in front of the side irons, $D'$ $D^2$, are disks $F'$ $F^2$, having on their faces scroll-ribs $a$, adapted to fit in between two rows of teeth, $b$, projecting from the faces of the side irons, so that when the disks are revolved the spiral rib $a$, running upon the teeth $b$, will cause the side irons to run up or down, according to which direction it is revolved, and, being attached to the axle by the shoulders, will also be carried up or down in a line with it by the dovetail groove. This is a very convenient and simple method of adjusting the frame, as the strains all coming in a line through the center of the axle, the disks will remain at whatever point they are left, and consequently do not need any holding devices to prevent the frame from falling downward. The long radius of the curves of the spiral rib $a$ also causes the parts to move upon each other with very little friction. Consequently the adjustment may be made with the exertion of a small amount of power.

The disks may be operated in many different ways; but I show three different methods— one by means of a clutch adapted to connect with the main drive-wheel, whereby the power of the latter is utilized to operate it when the machine is running; another arranged with an endless chain, sprocket-wheels, and a crank, whereby it may be operated by hand when the machine is at a standstill; and a third method, similar to the second, whereby the adjustment may be made at one or both ends at the same time by the driver from his seat while the machine is in motion.

In the first method (illustrated by Figs. 1, 2, 3, 4, 5, 6, 7, 8, 9, 10, 11, and 12) the disk F' is provided with a square hub, c, (see Fig. 3,) upon which a sleeve, G, is arranged to be moved back and forth by a pivoted lever, H'. Upon the face of this sleeve G clutch-teeth d are formed and adapted to engage with similar teeth upon a disk, e, secured to the main drive-wheel B, so that when the sleeve G is moved over against the disk e by the lever H' the revolution of the drive-wheel will be communicated to the disk F', and both the disks F' F² being attached to the axle E, both side irons, D' D², will be acted upon at the same time, so that when the clutch is thrown into gear and the drive-wheel moved forward the frame of the harvester will be elevated, and by backing the horses and revolving the drive-wheel backward the frame of course would be lowered.

The rear end of the lever H' is connected by a rod, g', to a hand-lever, K, running up on the rear side of the frame A, convenient to the hand of the driver, so that the clutch may be operated by him without getting down from his seat or stopping the machine.

An ordinary toothed segment and dog, as shown in Fig. 1, or a simple button, h, as shown in Fig. 19, may be used to hold the lever K, so that the clutch will be held out of gear when not in use.

Small hooks i' i² will be formed upon the ends of the side irons D', and projecting downward and upward at an angle to act as safety-stops against which the lever H' will strike if the clutch is held in contact with the disk e too long, to automatically throw the clutch out of gear, and prevent the spiral disks running up out of the side irons, or breaking them by running too far downward. By this simple arrangement all danger from the carelessness or neglect of the operator is avoided, as the device will thus be automatically thrown out of gear at a certain point upward or downward. In Fig. 6 these angular hooks i' i² are shown in dotted lines.

The grain-wheel C will also be provided with a similar set of toothed side irons, scroll-ribbed disks, clutch, lever, &c., except that, the work required of them being much less than of those on the drive-wheel end, the castings will be made much lighter. The lever H² of the grain-wheel end will be connected by a rod, g², to the same lever K, so that both clutches will be thrown into gear at the same time by one lever. Hence both ends of the machine will be raised or lowered at the same time. If desired, however, separate levers K may be provided for each end of the machine, or any other suitable mechanism may be used for connecting the disk F' to the drive-wheel B than the clutch.

Figs. 14 and 15 show the second method I have invented for operating the scroll-ribbed disks, consisting of a sprocket-wheel, M', attached to the disk F' in place of the clutch, and connecting it by a chain, N', to another sprocket-wheel, M², upon a shaft, P', secured in suitable bearings, R', upon the frame A, to which shaft a crank will be attached, and by revolving it the chain and sprocket-wheels will revolve the scroll-ribbed disks and raise and lower the frame A, as before described. This is a very simple and easy method of adjustment, but necessitates the stoppage of the machine.

Figs. 16, 17, and 18 show a third method of operating the device, similar to that shown in Figs. 14 and 15, consisting of a shaft, P², similar to the shaft P', arranged in suitable bearings, R², along the rear of the machine, and carrying three sprocket-wheels, M³ M⁴ M⁵—the first one, M³, opposite the sprocket-wheel M' of the drive-wheel B, the third one, M⁵, opposite a similar sprocket-wheel, M⁶, on the grain-wheel C, while the second wheel, M⁴, is opposite another sprocket-wheel, M⁷, mounted on a standard, T, on the seat-platform V.

The wheels M' M³ will be connected to each other by a chain, N², and the wheels M⁵ M⁶ will be similarly connected by a chain, N³, while the two wheels M⁴ M⁷ will be connected to each other by a chain, N⁴, the wheel M⁷ being also provided with a hand-wheel or crank, m, so that the driver, by revolving the wheel M⁷, may operate the scroll-ribbed disks through the chains and sprocket-wheels, and thus adjust both ends of the frame A at the same time while the machine is in motion and without leaving his seat.

Bevel-gears and an upright shaft may be substituted for the sprocket-wheels M⁴ M⁷ and chain N⁴, if desired.

Small lugs n will be formed upon the face of the disk F', between which the lever H' will enter when the clutch is thrown out of gear, to form a slight stop to the disk, to hold it stationary and prevent any accidental movement of it, either by the friction of the disk e upon the hub c or by other causes.

Under some circumstances the side irons may be made straight, as shown in Fig. 13; but generally they will be curved on a line the radius of which is from the center of the drive-pinion to the center of the side iron.

This invention may be also applied to some classes of mowing and reaping machines, and utilized for many other purposes.

I reserve to myself the right to make at some future time, in a separate application, claims to the specific construction of the clutch-method mechanism of elevating and lowering the frame.

What I claim as new is—

1. The combination of the frame, the main axle, the toothed bars connected to said frame, and the scrolls connected to the said axle and engaging with the teeth of said toothed bars, whereby the frame may be raised or lowered by turning the scrolls, substantially as set forth.

2. The combination and arrangement of a bar, D', formed with the teeth $b$ and dovetailed groove throughout its length, a shaft or axle, E, having a shoulder adapted to fit into said dovetail groove, and a disk or similar device, F', encircling said shaft and provided with a scroll-rib, $a$, adapted to fit between said teeth $b$, whereby the revolution of the scroll-rib and disk will raise or lower the toothed bar D', substantially as set forth.

3. The combination of the frame, the main axle, the grain-wheel axle, toothed bars connected to said frame, the scrolls connected to the said axles and engaging with the teeth of said bars, and means for connecting said parts, whereby the frame may be raised or lowered at both sides at the same time while the machine is in motion, substantially as set forth.

4. The combination of a toothed plate, D' $b$, scroll-ribbed disk F' $a$, mounted upon an axle at right angles to said toothed plate, and an endless chain, whereby said scroll-ribbed disk may be revolved forward and backward to raise and lower the frame, substantially as set forth.

In testimony whereof I have hereunto set my hand in the presence of two subscribing witnesses.

PAUL HANSON.

Witnesses:
  W. G. SCOTT,
  I. OLSEN.